United States Patent [19]

Winchell et al.

[11] 4,423,795
[45] Jan. 3, 1984

[54] WHEELED VEHICLE WITH CAMBERING FRONT MODULE

[75] Inventors: Frank J. Winchell, Orchard Lake; Jerry K. Williams, Sterling Heights; C. Clark Irwin, Dryden, all of Mich.

[73] Assignee: General Motors Corporation, Detroit, Mich.

[21] Appl. No.: 350,330

[22] Filed: Feb. 19, 1982

[51] Int. Cl.³ .............................................. B62D 61/08
[52] U.S. Cl. .................................. 180/215; 280/111; 280/282
[58] Field of Search .................... 280/112 A, 62, 111, 280/270, 274, 282, 420; 180/210, 215

[56] References Cited

U.S. PATENT DOCUMENTS

| | | | |
|---|---|---|---|
| 1,606,044 | 11/1926 | Reid | 280/420 |
| 3,277,840 | 10/1966 | Li | 105/145 |
| 3,698,502 | 10/1972 | Patin | 280/282 |
| 4,020,914 | 3/1977 | Trautwein | 180/210 |
| 4,065,144 | 12/1977 | Winchell | 280/112 A |
| 4,088,199 | 5/1978 | Trautwein | 180/209 |
| 4,316,520 | 2/1982 | Yamamoto et al. | 180/215 |
| 4,368,796 | 1/1983 | Patin | 180/215 |

FOREIGN PATENT DOCUMENTS

| | | |
|---|---|---|
| 929051 | 6/1955 | Fed. Rep. of Germany . |
| WO79/00686 | 9/1979 | PCT In'l Appl. . |
| 2014094 | 8/1979 | United Kingdom . |

Primary Examiner—John A. Pekar
Assistant Examiner—D. Lynn Fugate
Attorney, Agent, or Firm—Charles R. White

[57] ABSTRACT

A three-wheeled cambering vehicle having a rear non-cambering module which has a forwardly extending tongue which rotatably supports a main and front cambering module. The cambering module carries the vehicle operator who steers the vehicle by rotating a single front wheel about a substantially vertical axis and additionally leans in response to vehicle turn and his own will, the two modules are rotatable in relation to each other about an inclined camber axis extending longitudinally of the vehicle. The cambering module has cambering controls at a forward portion thereof to allow the operator to physically engage the controls with his feet for cambering the front module relative to the ground and rear modules.

9 Claims, 15 Drawing Figures

WHEELED VEHICLE WITH CAMBERING FRONT MODULE

This invention relates to cambering vehicles incorporating a centralized main support tongue extending forwardly from a wheeled rear fixed module and connected to a front camber module having operator actuated camber controls for front module camber about an inclined camber axis and operator actuated front wheel steering and a seat positioning the vehicle operator in a low center of gravity position in the camber module, the steering control being about an axis normal to the wheel axis and the camber control being about a longitudinal roll steer axis substantially coincident with the tongue axis.

Various cambering vehicles utilize two wheels on a transverse axis and a third wheel is rotatable about an axis approximately longitudinal of the vehicle and under operator control to effect camber. An illustrative vehicle is shown in British patent application No. 2,014,094. The vehicle of the present invention is of this general category. It advantageously utilizes a tongue forwardly extending from the rear module to withstand the moment due to the weight of the vehicle load and vehicle components and to withstand the torque imposed by the operator as he cambers. On installation the tongue is telescopically received by components in the front module, providing a simple and effective pivot construction interconnecting the two modules.

The preferred embodiment of the cambering vehicle of this invention has a fixed rear module housing a power package which drives laterally spaced rear drive wheels. The tongue is tubular and rigid so as to provide a main frame which extends forwardly from the rear module. The front camber module, that mounts a dirigible front wheel and the associated steering gear, has longitudinally spaced bearings which telescopically receive the tongue. The rigidity of the tongue in relation to applied moment, the spacing of the bearings, and the size of the bearings, are chosen to form an adequately strong and rigid vehicle chassis. The seat for the vehicle operator is located at a longitudinal position near the junction of the tongue and the balance of the rear module and at a minimal distance above the tongue. The camber controls are located forwardly of the seat and at positions convenient to the foot positions of the operator. The camber controls include foot actuated pedals which, by forward and aft coordinated movement tilt the front module on an inclined camber axis by application of torque on the roll steer axis against the forward end of the tongue. The camber mechanism is wholly contained within the front module. With this mechanism the operator can (a) manually steer the vehicle by dirigible steering control of the front wheel in relation to the longitudinal vehicle axis, (b) with front wheel steering input, independently and manually camber the front module on the longitudinal camber axis relative to the rear module and the support surface for maneuverability and stability when cornering, (c) with no left or right input to the steerable wheel roll steer the vehicle or (d) maintain and subsequently lock the two modules together for parking or noncambering mobile operation.

The shells or bodywork of the modules are streamlined and present small front surfaces to reduce aerodynamic drag to improve operating efficiency.

The general object of this invention is to provide an improved cambering vehicle which advantageously utilizes a rigid forwardly extending tongue to effect operator-controlled cambering and operator-controlled steering.

A further and more specific object of this invention is to provide an improved cambering vehicle of the foregoing type wherein the rigid forwardly extending tongue is affixed to the forward, cambering, module by a simple yet rigid connection that provides control in relation to a camber axis for cambering and lends itself to the advantageous location of the various vehicle controls as well as the advantageous location of the vehicle operator.

An additional and specific object of this invention is to provide an improved cambering vehicle of the foregoing type wherein the cambering controls are connected to the forward end of the rigid tongue so as to achieve a favorable, simple and effective overall camber control mechanism.

The present invention further resides in both overall and individual features of construction and combination whereby a highly simple, readily manufactured, reliable, vehicle is achieved which imparts to the user and operator a well-founded sense of reliable and solid vehicle control as well as achieving an attractive appearance, low fuel consumption, small vehicle track and profile, low vehicle height, and other desirable features.

These and other features, objects, and advantages of this invention will be more apparent from the following detailed description and drawings in which.

Turning now in greater detail to the drawings, there is shown in FIGS. 1-5 a three-wheeled, narrow-track vehicle 10 having a low center of gravity rear power module 12 with laterally spaced rear drive wheels 14, 16 and a cambering front operator carrying module 18 with a dirigible front wheel 20. The modules have thin outer shells of lightweight material such as aluminum which present smooth and streamlined surfaces and small frontal areas so that the vehicle can cut through the ambient air with minimized wind resistance and optimized fuel economy. The front module 18 has left and right skid plates 22, 24 projecting laterally from the sides thereof which provide ground contacts for the vehicle if predetermined vehicle roll is exceeded. The front module 18 is composed of frame-defining elements hereinafter described, seating and control elements, and has a hollow, shell-like housing. The latter is defined by a forward transparent windscreen 25 which may, if desired, be a full canopy suitably hinged for complete wind and weather protection for a vehicle operator D, FIG. 5, seated in the front module. For this accommodation, there is operatively disposed within the cockpit of the front module a hinged, preferably foldable, seat 26 and a preferably adjustable back rest 28 for the operator. A manual steering unit 34, illustratively shown as the handlebar type, includes handlebar 35 terminating in hand grips 36, 38. The handlebar 35 is operatively connected to the dirigible front wheel 20 as hereinafter described so as to permit the seated operator to manually hold the grips and steer the vehicle.

Rotation of grip 38 about its longitudinal axis controls engine throttle in conventional manner. Switch 39 is an engine kill switch mounted on the handlebar adjacent grip 38 which allows the operator to readily shut the engine down. Hand levers 40, 42 operatively associated with the hand grips 36, 38 are for conventional, operator-actuated front and rear wheel vehicle brakes. The switch and the rear wheel brake control require electrical or mechanical connections to the engine and other components in the rear module. As described hereafter, the tubular tongue construction of the present invention provides a convenient channel for some or all of these controls.

Figures 1, 2:
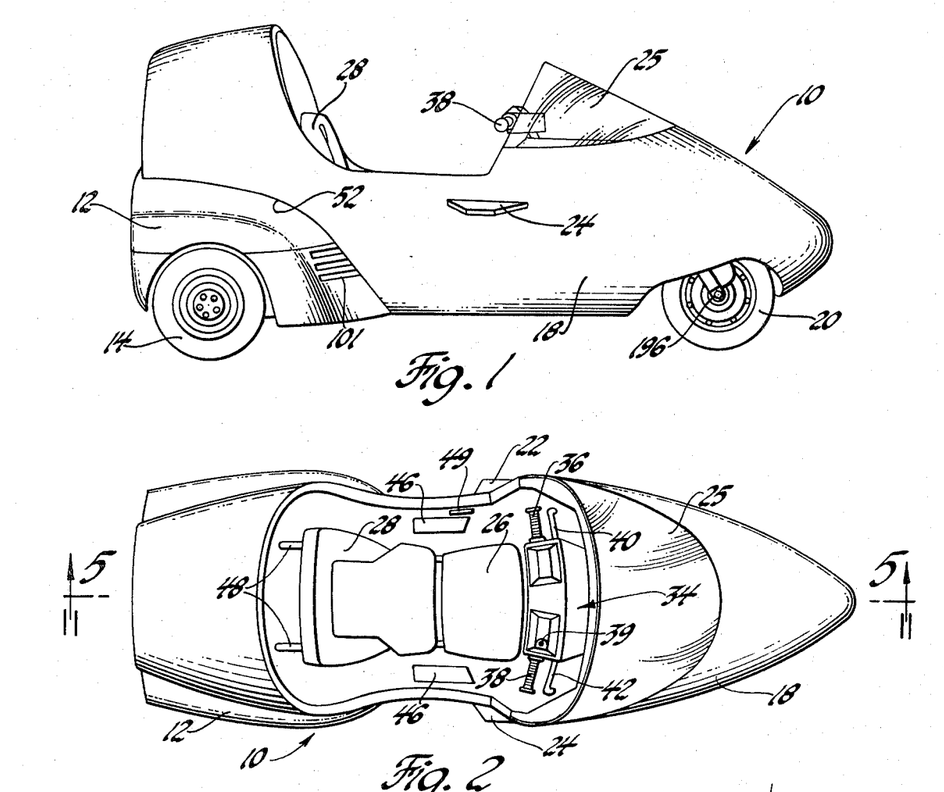
FIG. 1 is a side elevational view of the preferred embodiment of the invention.
FIG. 2 is a top plan view of the embodiment of FIG. 1.
Figure 3:
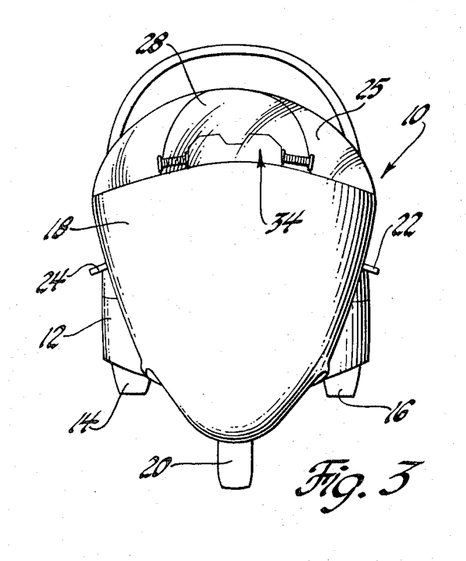
FIG. 3 is a front view of the embodiment of FIGS. 1 and 2.
Figure 4:
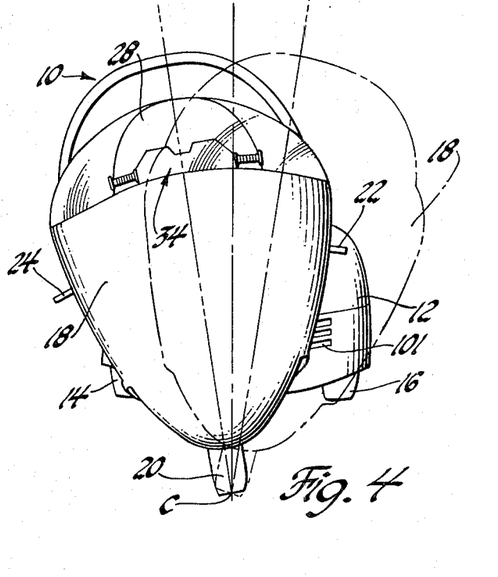
FIG. 4 is a front view like FIG. 3 depicting in full line right camber and in phantom left camber.

With the foldable seat in an up position, the operator can step into the cockpit in the front module and subsequently move into a seated position while displacing seat 26 downwardly. Arm rests 46 are attached to the interior of the operator module on opposite sides of the cockpit. The back rest 28 is movable to various positions through adjusters 48 operated by manual lever 49 and connecting cable, not shown, to maximize operator seating comfort. The bottom pan of the operator module is appropriately arched in the rear as indicated by reference numeral 52, FIGS. 1 and 7, forming an elevated floor panel for the front, cambering module extending over the top or roof panel 53 of the rear non-cambering module. The shapes of this floor and the roof panels of the modules are cylindrical sections having radii such as R, $R_1$, for one section to provide optimized clearance, so that the operator module can be cambered in clockwise and counterclockwise directions with respect to inclined camber axis C intersecting the front tire patch as illustrated in FIGS. 4 and 5.

Figure 5:
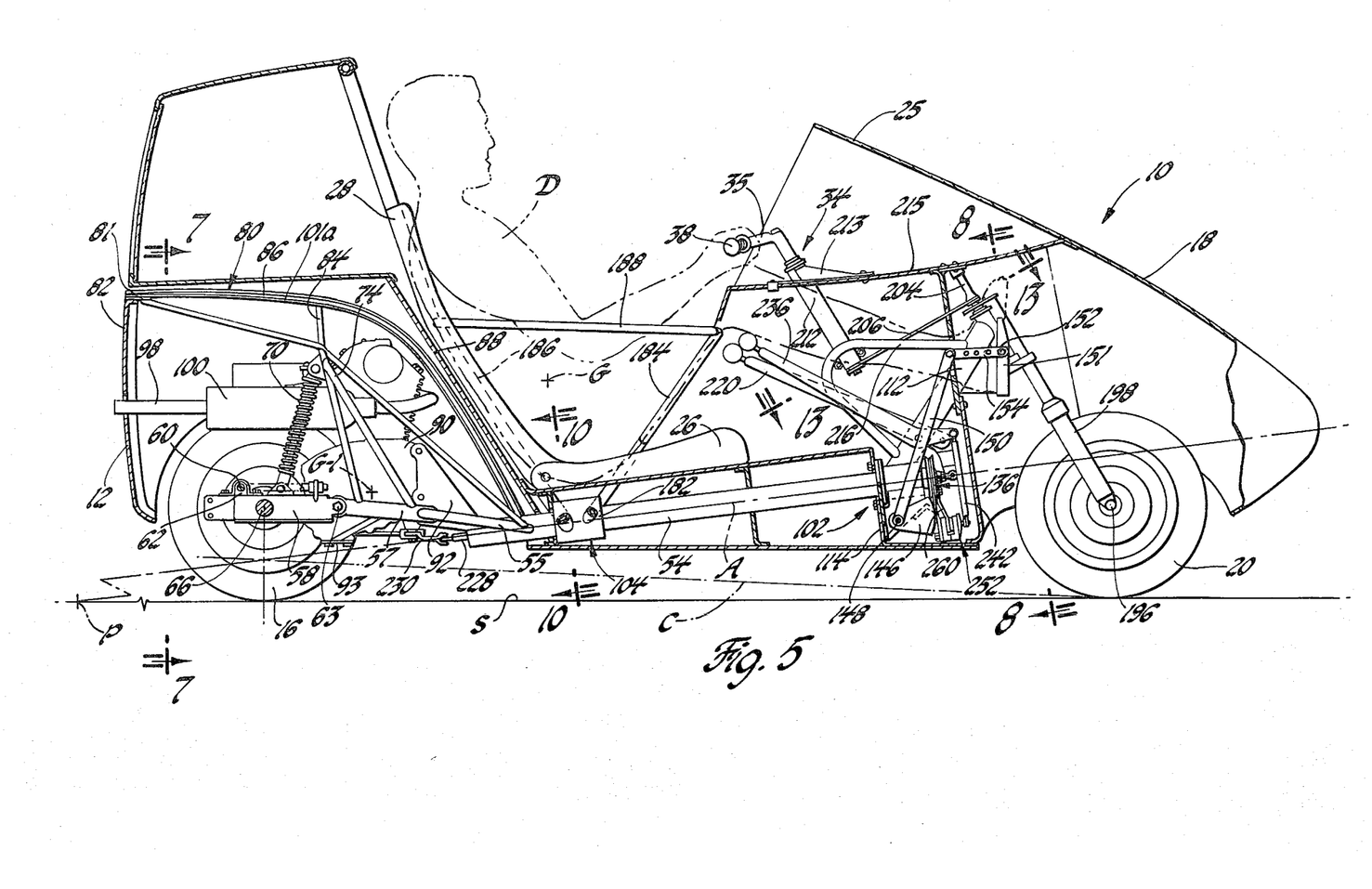
FIG. 5 is a longitudinal side elevation view of the vehicle of FIG. 2 with the housing broken away and the operator shown in phantom.
Figure 6:
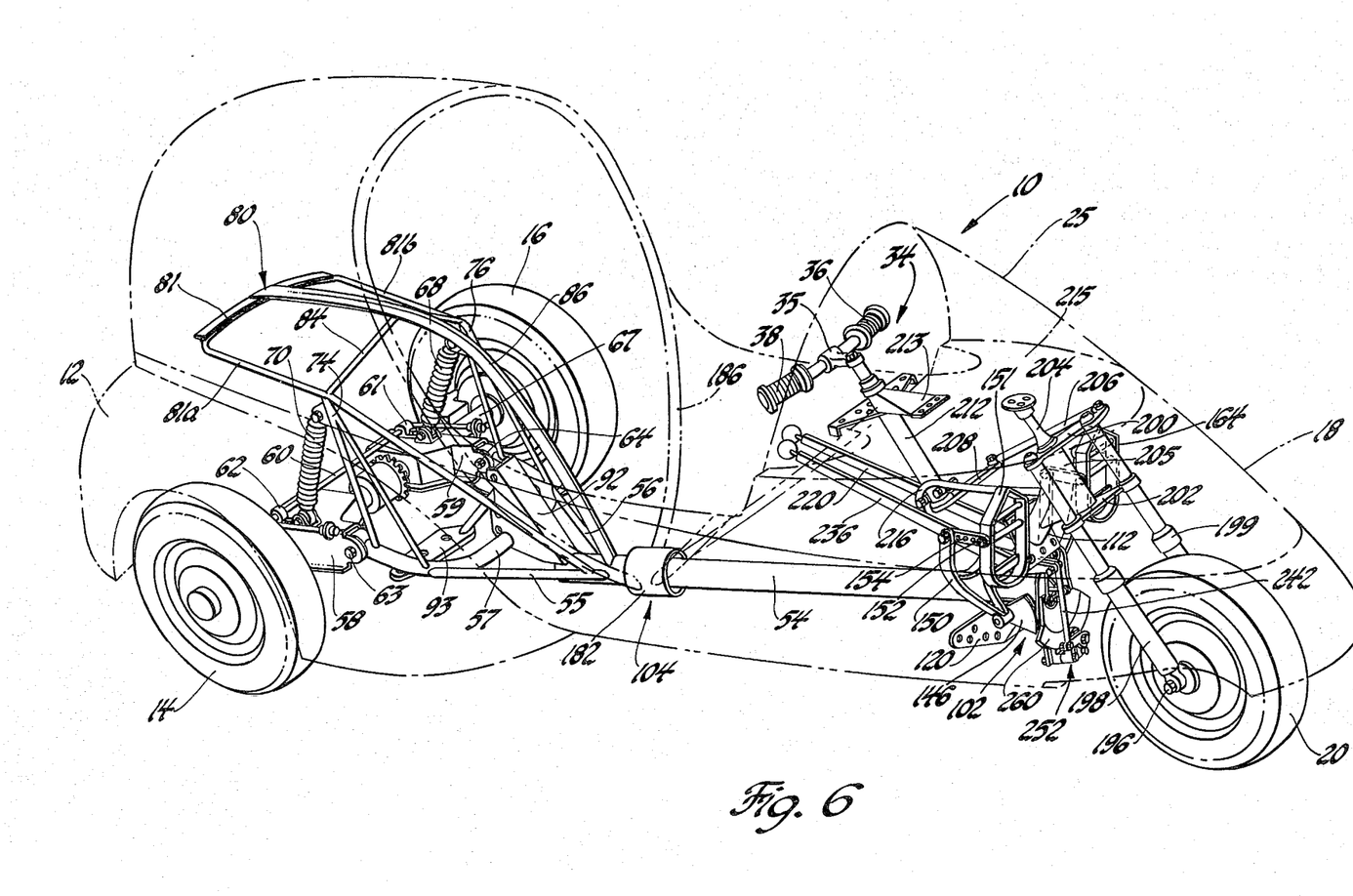
FIG. 6 is a perspective view of the cambering vehicle of FIGS. 1-5 with the housing shown in phantom lines and with certain drive train elements omitted.

Turning now in greater particularity to FIGS. 5 and 6, the cambering vehicle 10 has a centralized tubular tongue or main frame 54 which extends forwardly and gradually upwardly from the rear power module 12. This defines forwardly extending upwardly inclined roll steer axis A substantially on the vehicle centerline as seen from above. This roll steer axis intersects support surface S at a point P disposed a predetermined distance aft of the power module to provide roll understeering when the vehicle is cornered.

A pair of substantially horizontal side struts 55 and 56, FIG. 6, angle outwardly and rearwardly from attachment with the tongue 54 into connection with a U-shaped yoke 57. Pivotally mounted on the ends of the rearwardly extending arms of the yoke 57 are right and left side trailing or control arms 58, 59. These control arms are interconnected at their ends by transverse stabilizer bar 60, supported by left and right pillow blocks or bearings 61, 62 for movement in relation to the yoke and about pivot pins 63 and 64 during bouce and rebound. The right and left side rear wheels 14, 16 are operatively connected to and are driven by live axle shafts 66, 67, FIG. 7, and are respectively journaled in the control arms 58, 59. Left and right side suspension springs and shock absorber units 68, 70 for the rear power module are operatively interposed between the control arms and the upper ends of laterally spaced right and left side frame units 74, 76, FIG. 6. These frame units are composed of two upstanding bars joined together at their upper ends and welded or otherwise affixed to extend upwardly from rigid connection with the rearwardly extending arms of yoke 57. In addition to supporting the suspension struts 68 and 70, the side frames 74, 76 support a generally and horizontal upper frame 80. This upper frame is defined by substantially crosswise and horizontal member 81 affixed to the terminal ends of lateral spaced side bars 81a and 81b, attached, respectively, to the top ends of side frame units 74 and 76. A rigid backbone bar 86, FIG. 6, is affixed at its lower forward end to the rear part of tongue 54. Bar 86 arches rearwardly up and over the internal rear module parts and supports the roof panel 53 of the rear module and is supported at its most elevated part by side frame units 74 and 76, FIG. 6, and is affixed at its rear end to cross member 81.

Figure 7:
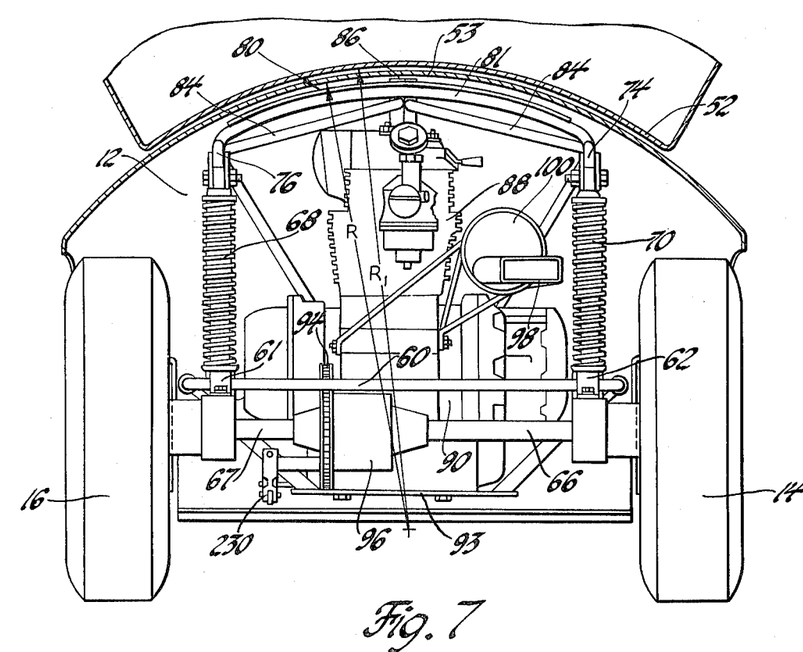
FIG. 7 is an enlarged end view of the rear module taken along lines 7—7 of FIG. 5.

An engine 88, FIGS. 5 and 7, and change speed power transmission 90 operatively connected thereto, are housed within the power module and are supported by engine mounting bracket 92, FIGS. 5 and 6. This bracket is of channel configuration as seen from the top and is supported at its bottom forward part by connection with the tongue 54 and at its bottom rear part by connection to bracket 93, FIG. 6. Bracket 93 extends between the arms of yoke 57 at their rearwardly extending portions and beneath the transmission 90 for support of the transmission and engine as seen in FIGS. 6 and 7. An endless chain 94 operatively connected to the output of the transmission 90 drives the input gear of a differential 96. The differential output drives the right and left live axle shafts 66 and 67 and the drive wheels 14 and 16 connected thereto. An exhaust pipe 98 and muffler 100 carry engine exhaust from the engine exhaust manifold through the rear panel of the power module to the exterior of the vehicle. The curved panels of aluminum or other appropriate material providing the shell or housing of the power module are secured to the frame above described by conventional quarter-turn fasteners, not shown. This shell is generally indicated at 101a in FIG. 5. The louvered openings 101 in the panels of the rear module are air intakes to allow air to enter and circulate through the power module for engine cooling and breathing purposes. The rear module has a center of gravity, approximately point G-1, FIG. 5, which is low with respect to the support surface and forward of the rear wheel axis. This provides for high stability during all phases of vehicle operation including high speed cornering so that this module does not tend to roll over.

Figure 9:
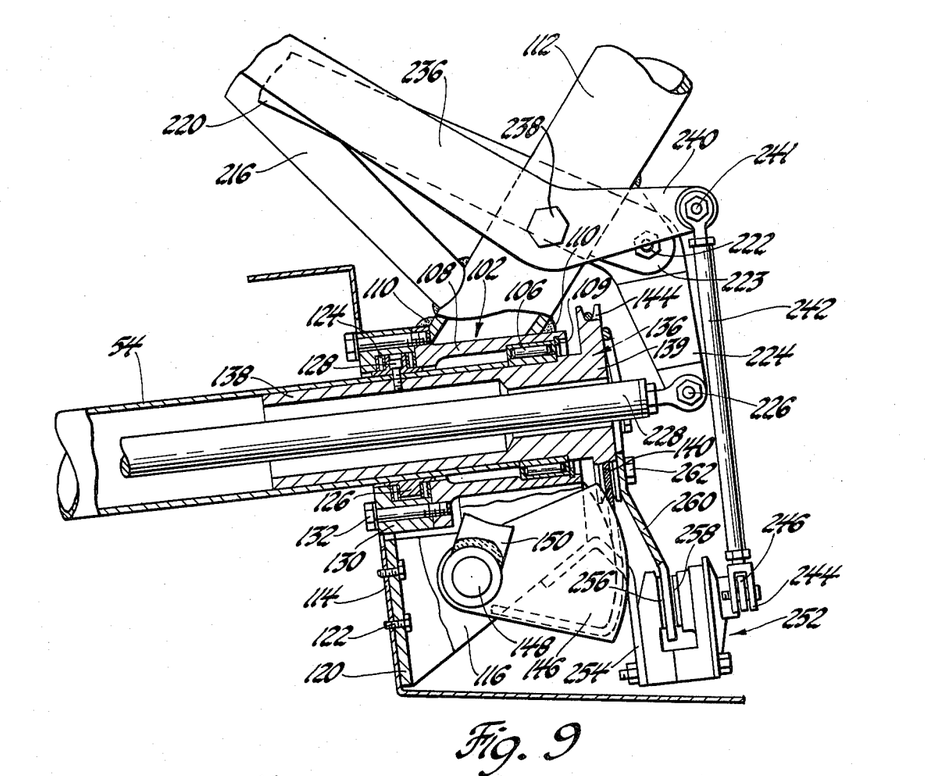
FIG. 9 is an enlarged fragmentary side view partially in section and partially in side elevation taken along lines 9—9 of FIG. 8.

The front or operator module 18 is pivotally connected to the tongue 54 for limited clockwise or counterclockwise cambering movement by front and rear bearing assemblies 102 and 104 which are part of the front module. Referring to FIG. 9, the front bearing assembly 102 incorporates an annular roller bearing 106 telescoped over on the forward outer end of the tubular tongue or frame 54. The outer race of this roller bearing fits into and supports a mounting sleeve 108 which is rigidly secured to and integral with the front module to support the vehicle. An inner annular shoulder and snap ring 109 fitted internally within mounting sleeve 108 trap and retain the roller bearing 106 in position. The mounting sleeve 108 is affixed by weldments 110 to the tubular and upwardly inclined forward frame 112, FIGS. 9 and 5. The bottom of sleeve 108 is rigidly connected to a substantially vertical and crosswise bulkhead 114, FIGS. 9 and 14, of the front module by a support arm 116 formed by a plate which terminates in a laterally extending flange 120, FIGS. 6 and 9. Threaded fasteners 122 securely join the bulkhead 114 and the flange 120. The front bearing assembly 102 also includes a thrust bearing assembly 124, FIG. 9, disposed around tongue 54 aft of the bearing 102 to resist thrust loads. The thrust bearing assembly 124 includes an annular thrust shoulder 126 secured by threaded fastener 128 to the end of the tongue 54. A cylindrical cover 130 is provided for the thrust bearing and is secured to the inner end of mounting sleeve 108 by threaded fasteners 132. Separate annular thrust bearings are mounted between the shoulder 126 and the end of the mounting sleeve 108 and between an inner wall of the cover 130 and the shoulder 126 as shown in FIG. 9.

Figures 14, 15:
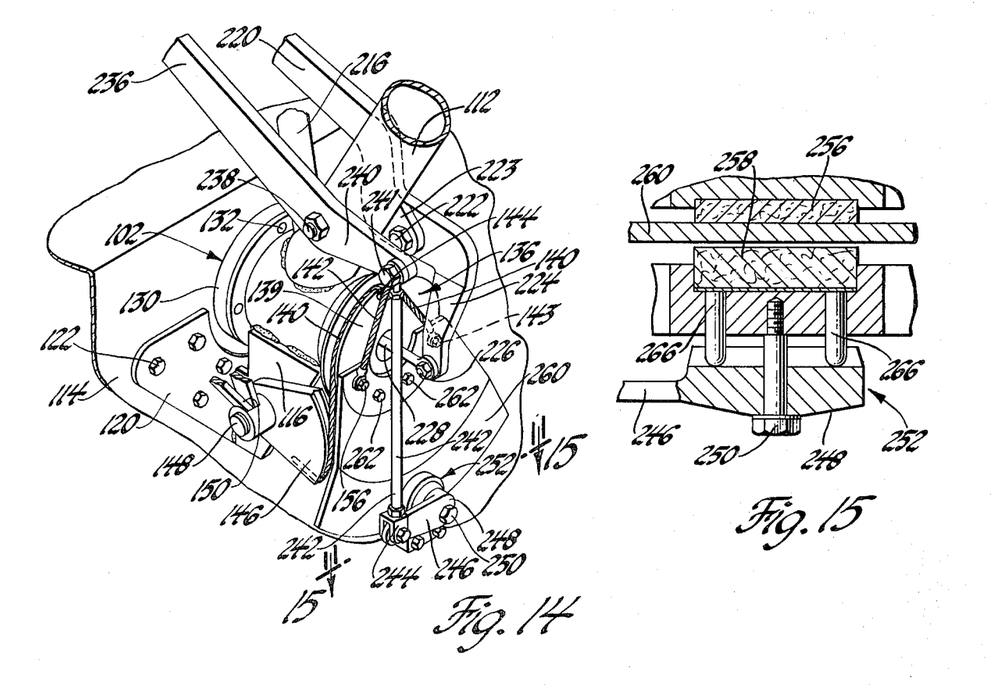
FIG. 14 is an isometric view of a fragmentary portion of the cambering mechanism of the vehicle of FIGS. 1-13.
FIG. 15 is a fragmentary sectional view taken along lines 15—15 of FIG. 14.

A camber cable ground unit 136 is telescopically received within tongue 54 as seen in FIG. 9 and extends forwardly outboard the tongue to receive the camber control cables hereinafter described. The shank portion 138 of ground unit 136 extends rearwardly from the cable-receiving forward annular head portion 139 into a close telescopic fit within the end of the tongue 54 as shown. The shank 138 is rigidly secured within the tongue by the threaded fastener 128 and the snug telescopic fit. With this connection, the head portion is rigidly secured immediately in front of the tongue 54. As seen in FIG. 14, head portion 139 is similar in construction to a pulley sheave and defines a groove substantially circumferential of the tongue 54 to receive right and left side cables 140 and 142. Cable 140 is attached to the front face of head portion 139 by threaded fastener 143 and leads upwardly from this attachment into a retainer slot 144 in the head portion 139 into the groove thereof. From this groove the cable 140 extends downwardly into attachment with a right foot pedal sector 146. This sector 146 is mounted for rocking movement on shaft 148 which is in turn supported by the support arm 116 of front bearing assembly 102. A right pedal arm 150, FIGS. 5, 6, 8 and 9, is affixed to sector 146 and is therefore rockably mounted on shaft 148. Pedal arm 150 extends upwardly and forwardly and carries right foot pedal 151. This foot pedal is pivotally attached to pedal arm 150 by pivot pin 152 and adjustment links 154. By pushing forwardly on the right foot pedal 151, the right pedal arm 150 will be turned in a clockwise direction to likewise turn the sector 146 to take up cable 140 and rotate the pedal sector plate 146 in the clockwise direction about the roll steer axis. This action cambers the front module 18 to the left as shown in broken lines in FIG. 4 for cambered left turns. In such cambering operation cambering reaction torque is transmitted to the cable head portion 139 grounded by the tongue 54, the rear module 12 and the rear wheels 14, 16.

The left side cable 142 is connected to the grounded head portion 139 by threaded fastener 156. From this threaded fastener, the cable 142 leads into the retainer slot 144 and the groove in head portion 139 to the left side pedal sector 160, FIG. 14, which is pivotally mounted on the shaft 148 and which is integrally connected with the left side pedal arm 162. This arm carries a left foot pedal assembly 164 which is connected thereto by pivot pin 166 and adjustment links 168 similar to that described in connection with the right side control of the camber mechanism. When the operator displaces the left side foot pedal 164 forwardly, the left side sector 160 will turn downwardly to take up cable 142 so that the front operator module connected thereto will camber to the right for right cornering by an amount selected by the operator to suit vehicle operating conditions.

The motions of the foot pedals are coordinated by the operator. He normally places his feet on both, with light forward foot pressure on each in a comfortable amount to hold the front module in a vertical orientation with respect to the camber axis C. To camber, he increases the force against one foot pedal and decreases the force against the other to provide stabilized cambering for optimized maneuverability during cornering in congested areas or over tortuous paths at a wide range of vehicle speeds.

Figure 10:
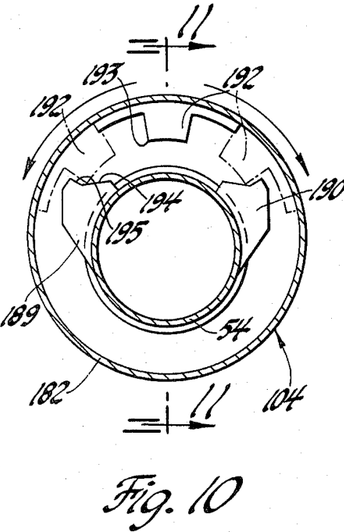
FIG. 10 is an enlarged cross-sectional view taken along lines 10—10 of FIG. 5.
Figure 11:
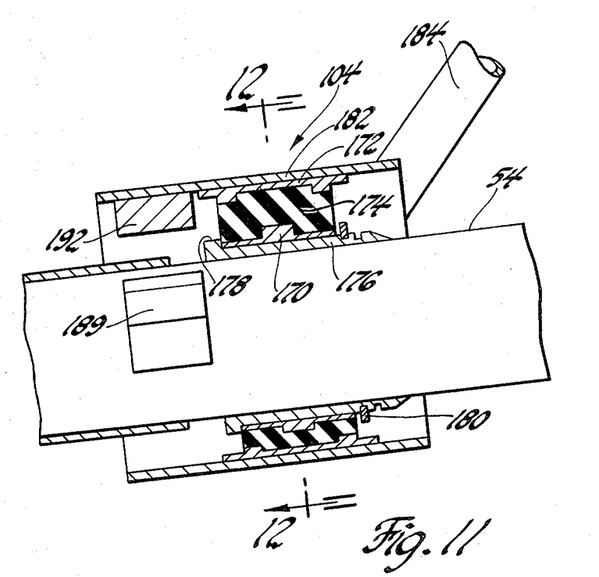
FIG. 11 is a fragmentary cross-sectional view taken along lines 11—11 of FIG. 10.
Figure 12:
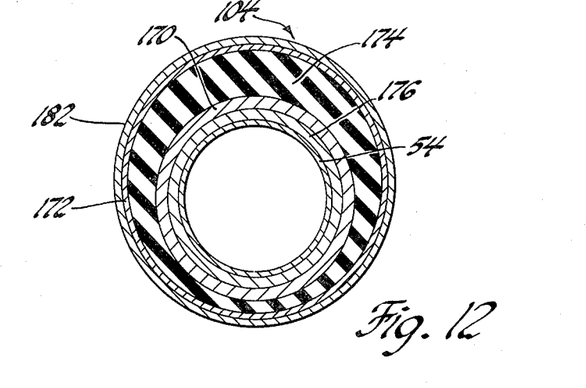
FIG. 12 is a cross-sectional view taken along lines 12—12 of FIG. 11.

The rear bearing assembly 104 of the front module is shown in detail in FIGS. 10, 11 and 12 and comprises inner and outer cylindrical metallic sleeves 170 and 172 having an annular elastomeric cushion damper 174 bonded therebetween. The rear bearing assembly is positioned beneath the seat 26 and the eccentricity of the damper provides additional spring material beneath the driver to cushion the ride and thereby improve comfort. The inner sleeve 170 rotatably fits on a bearing sleeve 176 that is fixed on the tongue 54 and is retained on the mounting sleeve between shoulder 178 and snap ring 180. The outer sleeve 172 is disposed inside of a cylindrical mounting collar 182 forming a part of the front module. Tubular side frame elements 184 and 186 are part of the right side framework of the front module cockpit and diverge upwardly from welded connection with the collar 182 into connection with a longitudinal side frame element 188. Similar framing elements not illustrated are provided for the left side of the cockpit.

As shown in FIG. 10, the tongue 54 in the region telescoped by rear bearing unit 104 has arcuately spaced radially extending right and left limit stops 189, 190 welded or otherwise secured thereto which extend outwardly from opposite sides thereof. These limit stops are adapted to be contacted by the fixed stop 192 of the front module that extends radially inwardly from the inner wall of the cylindrical mounting collar 182 for the cushioned limit stop of right and left camber. When the front module cambers to the right, the right corner 193 of stop 192 initially engages the inclined wall 194 of right limit stop 189. This action forces stop 192 to move radially outwardly with respect to stop 189 to deflect the cushion 174. After such deflection, the side wall of the stop 192 seats against the terminal stop surface 195 of stop 189. This limits the extent of right camber as shown in dashed lines in FIG. 9. Engagement of the fixed stop 192 with the left limit stop 190 in a similar manner provides the cushioned limit of left camber.

Figure 13:
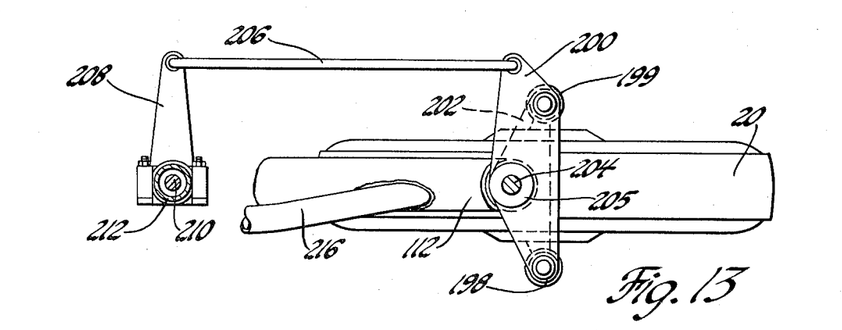
FIG. 13 is an enlarged fragmentary view taken along lines 13—13 of FIG. 5.

Turning now in greater detail to the manual steering of this vehicle, the dirigible front wheel 20 is rotatably supported on axle shaft 196 at the lower end of a pair of telescopic suspension struts 198 and 199 as shown in FIGS. 5, 6. These struts are inclined forwardly at a predetermined rake angle and can be turned as a unit for steering purposes while being maintained in laterally spaced position by upper and lower brackets 200, 202. As shown in FIGS. 6 and 13, these brackets are connected to a steering shaft 204 rotatably mounted in an inclined tubular collar 205 that is welded to the upper end of forward frame 112.

A relay rod 206 interconnects upper bracket 200 with a steering lever 208 which is in turn connected to the lower end of the handlebar operated main steering shaft 210 mounted for turning inside of fixed steering support tubing 212 for turning by the handlebar 35. The support tubing 212 is held stationary within the front module by an upper bracket 213 fixed to an upper panel 215 of the front module and by rigid attachment at its lower end with a connector tube 216 bent generally U-shaped to have spaced legs welded at their ends along the support tubing 112. With the attachment of the steering to the front module, any cambering movements of the front module will likewise camber all of the front steering components fixed thereto.

As illustrated in FIGS. 5, 6, 9 and 14, there is a manually operated transmission shift lever 220 pivoted by pivot 222 to an ear 223 welded to the support tubing 112. From the fulcrum provided by the pivot 222, FIG. 9, the bell crank end 224 of the shift lever extends downwardly to the axis of tongue 54 where it pivotally connects at 226 to the front end of an elongated shift rod 228 that extends through the tongue tubing 54. The aft end of the shift rod 228 extends from tongue 54 into connection with a transmission control linkage 230 which is operatively connected to the transmission gearing not shown. The operator changes gear ratio by manually pivoting the shift lever 220 on pivot 222 to selected positions to linearly displace the shift rod 228 to actuate the transmission control linkage 230 for gear ratio selection.

The shift action above described involves only rocking movements of the shift control about the axis defined by pin 222, FIG. 9, and fore aft movements of the rod 228 telescoped within tongue 54. If desired, additional control extending from the front module to the rear module can be achieved by rotating the shaft 228. Such control may, for example, be a part of the shift pattern. It may also be a part of the engine throttle or other control. The separate fore and aft movement of the shaft 228, and turning movement may be achieved by suitable mechanism such as a shift fork, known in the art.

Figure 8:
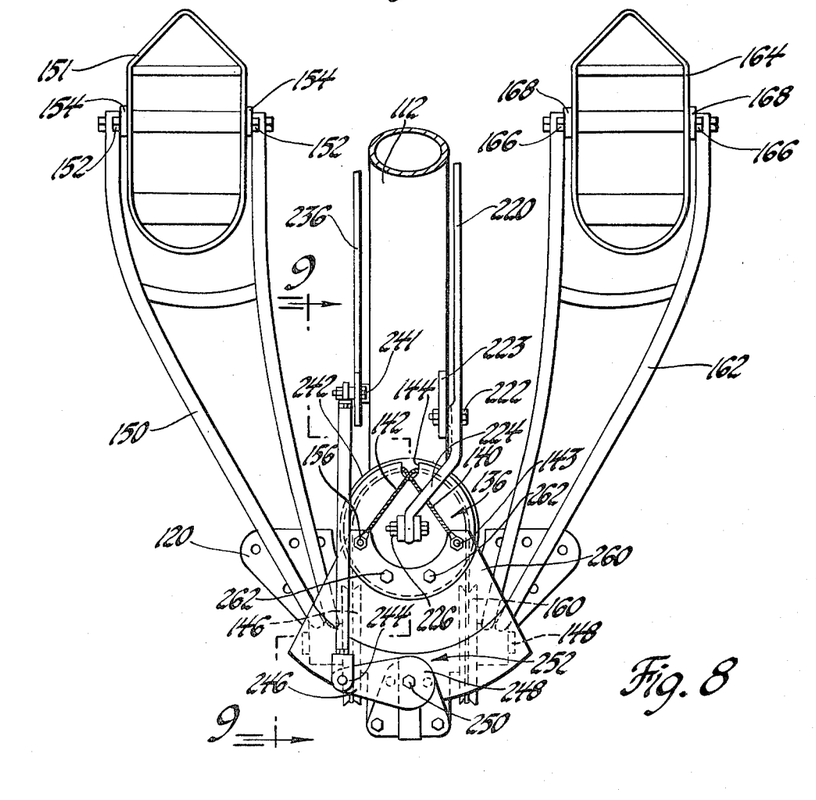
FIG. 8 is an enlarged fragmentary view of the cambering mechanism taken generally along lines 8—8 of FIG. 5.

In addition to the transmission shift lever 220, there is a camber lock lever 236 which is mounted by pivot 238 to the forward support tube 112. The lower or crank end 240 of the camber lock lever 236 is pivotally connected at 241 to the upper end of a vertical rod 242 which extends downwardly and terminates in an end portion 244. As shown in FIGS. 8, 9 and 14 the end portion 244 of rod 242 is pivotally connected to a lever arm 246 of a cam 248 supported by centralized pivot bolt 250 extending outwardly from a camber lock assembly 252. This camber lock assembly is secured to a bracket 254 attached to arm 116 and is thus connected to the mounting sleeve 108 of the front module and cambers therewith. The camber lock assembly 252 has brake pads 256, 258 which are spaced from one another to receive the arcuate end of pie-shaped camber lock plate 260 therebetween. The camber lock plate 260 is secured by bolts 262 to the cable sector 136 and is thus grounded through the tongue 54. With this arrangement the camber lock assembly turns with the front module relative to the fixed camber lock plate.

As shown in FIG. 15 the camber lock assembly 252 has a pair of pins 266 mounted for longitudinal stroking movement in the housing on either side of the central pivot 250. These pins are contacted by the camming surface on the rear side of the cam member 248. When the lever 246 is turned by actuation of the camber lock lever 236, the pins 266 will be forced inwardly to move the brake pad 258 toward pad 256 to thereby grip the camber lock plate 260 therebetween so that the front module is locked upright or at any selected camber angle position relative to the rear module for vehicle parking purposes. Moving the lever 246 to its original position removes the braking force to allow cambering.

The vehicle operator, with the camber lock engaged to secure the modules together, can readily step into the cockpit and swing the seat bottom to its support position. The operator seated in a relatively lwo center of gravity position G can then extend his legs forwardly and place his feet on the forwardly located foot pedals 151 and 164 to manually hold the vehicle in an upright position by the associated camber control mechanism after release of the camber lock. The vehicle can then be driven along a roadway in an upright position with minimal balancing effort being maintained on the foot pedals by the operator. In the event that operator stabilized cambered turns are desired, the front module can be readily leaned to the left and right into turns at a wide range of vehicle speeds to the extent permitted by the camber stops 189, 190. With forward force exerted through the right leg of the operator, the front module is cambered to the left and conversely with forward force through the operator's left leg, the front module will be cambered to the right. Since the rear module has a lower center of gravity G-1 and good gripping power on the roadway it is not cambered and is effectively used to provide the ground contact for the cambering front module. Since only the front module is cambered and that module has a low center of gravity and low moment of inertia, work required of the operator in cambering operation is minimized.

As described above, the tongue 54 is tubular and receives the shift rod 228. Since this rod is on the roll steer axis between the forward and rear modules, the bar remains on its own axis (and the axis of tongue 54) irrespective of cambering. The linkage between the manual shift member 236 and the transmission 90 can be made to provide a positive connection between these parts and a certainty that the transmission is in the shift condition desired by the operator and indicated by the position of the manual shift member. If the particular transmission requires motions in two directions for shift purposes, such as the "H" shift pattern, the shift control rod 228 may execute one of these motions by longitudinal shift and the other motion by rotation about its own axis. In such instance, the axial shift connection at each end of the shift rod 228 can be made by forked links and cooperating spools on the rod 228 and the rotational shift connection made by splines at each end of the shift rod 228. The respective axial and rotational movements are thereby made independently of each other to provide the shift movements.

Roll steering can be accomplished by cambering the front module to the left or right on camber axis C without appreciable steering input to the handlebar assembly. When the front module is cambered left the tongue 54 on the rearwardly inclined roll steer axis A will swing to the left a corresponding amount with respect to point P. When this occurs, the right rear wheel will be rotated forward relative to the left rear wheel to steer the rear axle into the turn and effect a roll understeered left turn. In a similar manner, roll understeered right turns can be executed by cambering the front module to the right. When negotiating torsions and narrow paths or roadways increased right and left turn steering inputs can be made while cambering so that the vehicle easily and quickly covers the selected track while the driver maintains a good sense of balance while making operator stabilized cambered turns. With such characteristics the vehicle can be easily and comfortably handled by operators possessing varying driving skills including those having little or no experience with cambering vehicles. When the vehicle is stationary, such as at stop signs, the operator can easily maintain the vehicle in an upright position by the camber control without resort to the camber lock by instinctive substantially uniform pressure on the left and right feet applied to the foot pedals in unison. If locking of the vehicle is desired, the camber lock can be engaged to hold the position of the front module in an upright manner or at any angular position.

While a preferred embodiment of this invention has been shown and described, other modifications will be apparent to those skilled in the art. Accordingly, the scope of this invention is set forth in the following claims.

The embodiments of the invention in which an exclusive property or privilege is claimed are defined as follows:

1. A narrow-track cambering vehicle comprising a rear module having a pair of laterally spaced surface engaging wheels and a forwardly longitudinally extending roll torque resisting tongue and a front module receiving said tongue and carrying a vehicle operator, a front wheel operatively disposed in said front module forward of the front end of the tongue, said vehicle further including bearing means substantially at the junction of the tongue and rear module interconnecting the tongue and front module so that said vehicle operator can camber said front operator carrying module on an inclined camber axis relative to said rear module between predetermined limits in clockwise and counterclockwise directions about said camber axis, manual steering means for steering said front wheel, operator actuated cambering mechanism secured to the forward end of said tongue and forward of the vehicle operator for operatively interconnecting said tongue and said front module, said cambering mechanism being manually manipulated by said vehicle operator so that said operator can directly manually camber said front module in relation to the rear module a controllable amount by exerting a selected torque on said front module through said cambering mechanism, and seat means disposed in said front module for supporting said vehicle operator at a lower center of gravity position therein and directly in front of the rear module.

2. A narrow track cambering vehicle comprising a rear module having a pair of laterally spaced surface engaging wheels and a longitudinally extending torque resisting tongue and a front module for carrying an operator and recieving said tongue, a front wheel operatively disposed in said front module, said vehicle further including pivot means interconnecting the tongue and front module so that said operator can manually camber said front module relative to said rear module between predetermined limits in clockwise and counterclockwise directions about a longitudinal camber axis substantially below said tongue, manual steering means for steering said front wheel, operator actuated cambering mechanism forwardly positioned in said front module operatively supported by said tongue and said front module and physically manipulated by said operator to manually power camber said front module in relation to the rear module a controllable amount by exerting manual torque to the front module with said tongue providing reaction and vehicle operator seat means disposed in said front module for supporting the vehicle operator at a low center of gravity position therein between said rear module and said cambering mechanism.

3. A narrow-track cambering vehicle comprising a rear module having an engine and a change speed transmission, said rear module further having a pair of laterally spaced surface engaging drive wheels operatively connected to said transmission and a hollow longitudinally extending torque resisting tongue, a front module for carrying a vehicle operator and operatively supported on said tongue, a front wheel and a transmission control lever operatively disposed in said operator carrying module, said vehicle further including pivot means interconnecting the tongue and front module for cambering movements relative to said rear module between predetermined limits in clockwise and counterclockwise directions about a longitudinal camber axis which inclines rearwardly from a predetermined point established by the contact of the front wheel and a roadway, manual steering means for steering said front wheel, operator actuated cambering mechanism operatively connected to said operator module and to said tongue and physically engaged by said operator so that said operator can manually camber said front module in relation to the rear module a controllable amount by exerting manual input cambering torque on said mechanism, transmission control means extending through said tongue operatively connected to said transmission, a transmission control lever mounted in said front module, and connector means operatively connecting said transmission control lever to said transmission control means, and seat means disposed in said front module for supporting the vehicle operator at a low center of gravity position therein.

4. A narrow-track and operator-stabilized cambering vehicle comprising a rear power module in which a vehicle power plant and a pair of spaced surface engaging drive wheels are operatively mounted and a front module for a vehicle operator having a steerable front wheel operatively mounted therein, a centralized elongated tongue secured to said rear module and extending into said front module, pivot means in said front module and operatively connected to said tongue so that said operator module can be cambered between predetermined limits in clockwise and counterclockwise directions about a longitudinal camber axis, manual steering means for steering said front wheel, an operator-actuated cambering mechanism in said operator module for cambering said front module, said cambering mechanism including left and right foot pedal means receiving the left and right feet of said operator, elements interconnecting to foot pedals with each other and the tongue so that a cambering torque on the front module is exerted in accord with the direction of movement of said foot pedal means, seat means disposed within said front module rearwardly of said foot pedal means for seating a vehicle operator therein at a low center of gravity position in front of said power plant with the operator's feet forwardly extending and engaging said foot pedal means, said front module having a minimal frontal surface area and optimized aerodynamic shape, and reaction means composed of a ground unit secured to a forward end portion of said tongue means and thereby connected to the rear power module, said ground unit being disposed forwardly of the seat means and cooperatively associated with said operator-actuated cambering mechanism permitting said operator to impress selected manual loads on said foot pedal means to thereby manually camber said front module relative to said power module on said camber axis to effect vehicle camber steering and cornering under operator stabilized conditions.

5. A narrow-track and operator-stabilized cambering vehicle comprising a rear power module in which a vehicle power plant and a pair of laterally spaced drive wheels are operatively mounted and an operator module having a steerable front wheel operatively mounted therein, pivot means interconnecting said modules in tandem so that said operator module can be cambered between predetermined limits in clockwise and counterclockwise directions about a camber axis, operator actuated manual steering means in said operator module for steering said front wheel, seat means disposed in said operator module for supporting a vehicle operator therein at a low center of gravity position in front of said power plant, a centrally disposed support tongue connected with the rear power module extending forwardly of the operator seat means and terminating in a camber reaction member, and an operator actuated cambering mechanism having elements cooperatively associated with the reaction member and said operator module and housed entirely in said operator module and controlled by said operator for cambering said operator module relative to said power module to effect camber steering and cornering under operator stabilized conditions.

6. An operator-stabilized cambering vehicle comprising a rear power module in which a vehicle power plant and a pair of laterally spaced surface engaging drive wheels are operatively mounted, a front operator module having a steerable front wheel operatively mounted therein, pivot means interconnecting said modules in line with one another so that said operator module can be cambered with respect to said rear power module between predetermined limits in clockwise and counterclockwise directions about a longitudinal camber axis inclined downwardly from said rear power module toward the front of the vehicle, manual steering means for steering said front wheel, an operator actuated cambering mechanism disposed wholly within said operator module for cambering said front operator module, seat means disposed within said operator module rearwardly of said cambering mechanism for seating a vehicle operator therein at a low center of gravity position in front of said power plant and immediately above said camber axis, said front operator and rear power modules having outer shells providing minimized aerodynamic drag, reaction means composed of elements connected with the rear power module and extending forwardly of the seat means cooperatively associated with said operator-actuated cambering mechanism permitting said operator to camber said front operator module relative to said rear power module on said camber axis to effect camber steering and cornering of said vehicle under operator stabilized conditions.

7. A vehicle comprising a noncambering rear power module in which a vehicle power plant and a pair of laterally spaced drive wheels are operatively mounted and a cambering operator module having a steerable front wheel operatively mounted therein, pivot means interconnecting said modules in line so that said operator module can be rolled to predetermined limits in clockwise and counterclockwise directions about a longitudinal roll axis provided by said pivot means, operator actuated control means in said operator module for steering said front wheel, seat means disposed in said operator module for supporting a vehicle operator therein at a low center of gravity position in front of said power plant and actuator means disposed entirely in said operator module in front of the vehicle operator and controlled by said operator for manually and rapidly rolling said front module relative to said power module to effect camber steering and stabilized cornering of said vehicle.

8. A vehicle comprising a noncambering rear power module in which a vehicle power plant and a pair of laterally spaced drive wheels are operatively mounted and a cambering front operator module having a steerable front wheel operatively mounted therein, pivot means interconnecting said modules in tandem so that said operator module can be rolled to predetermined limits in clockwise and counterclockwise directions about a longitudinal roll axis provided by said pivot means, said power and operator modules being enclosed by thin walled outer shells steamlined to optimize aerodynamic drag and vehicle operating efficiency, said power module nesting within a rearward portion of said operator module, operator actuated control means in said operator module for steering said front wheel, seat means disposed in said operator module for supporting a vehicle operator therein at a low center of gravity position in front of said power plant and actuator means wholly contained in said operator module and controlled by said operator for manually rolling said front module relative to said power module to effect camber steering and cornering under stabilized conditions.

9. A vehicle comprising a noncambering rear power module in which a vehicle power plant and a pair of laterally spaced drive wheels are operatively mounted and a cambering front operator module having a steerable front wheel operatively mounted therein, pivot means interconnecting said modules in line so that said operator module can be rolled to predetermined limits in clockwise and counterclockwise directions about a longitudinal roll axis provided by said pivot means, said power and operator modules having exterior thin walled shells cooperatively steamlined to optimize aerodynamic drag and vehicle operating efficiency, said power module nesting within a rearward portion of said operator module and cooperating therewith to form the rear end of said vehicle, operator actuated control means in said operator module for steering said front wheel, seat means disposed in said operator module for supporting a vehicle operator therein at a low center of gravity position in front of said power plant and actuator means wholly contained in said operator module and controlled by said vehicle operator using his legs and feet for manually rolling said front module relative to said power module to effect camber steering and cornering under stabilized conditions.

* * * * *

UNITED STATES PATENT AND TRADEMARK OFFICE
CERTIFICATE OF CORRECTION

PATENT NO. : 4,423,795

DATED : January 3, 1984

INVENTOR(S) : Frank J. Winchell et al

It is certified that error appears in the above—identified patent and that said Letters Patent is hereby corrected as shown below:

Column 4, line 13, "bouce" should read -- jounce --.

Column 8, line 28, "lwo" should read -- low --.

Column 11, line 4, claim 4, "to" should read -- the --.

Signed and Sealed this

Twenty-second Day of May 1984

[SEAL]

Attest:

GERALD J. MOSSINGHOFF

Attesting Officer     Commissioner of Patents and Trademarks